(12) United States Patent
Riley et al.

(10) Patent No.: US 10,253,634 B2
(45) Date of Patent: Apr. 9, 2019

(54) GAS TURBINE ENGINE AIRFOIL TRAILING EDGE SUCTION SIDE COOLING

(71) Applicant: United Technologies Corporation, Farmington, CT (US)

(72) Inventors: Sarah Riley, Glastonbury, CT (US); Sasha M. Moore, East Hartford, CT (US); Jeffrey R. Levine, Vernon Rockville, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 259 days.

(21) Appl. No.: 14/892,713

(22) PCT Filed: Apr. 25, 2014

(86) PCT No.: PCT/US2014/035419
§ 371 (c)(1),
(2) Date: Nov. 20, 2015

(87) PCT Pub. No.: WO2015/012918
PCT Pub. Date: Jan. 29, 2015

(65) Prior Publication Data
US 2016/0090846 A1     Mar. 31, 2016

Related U.S. Application Data

(60) Provisional application No. 61/830,847, filed on Jun. 4, 2013.

(51) Int. Cl.
| F01D 5/18 | (2006.01) |
| F01D 9/04 | (2006.01) |
| F01D 25/12 | (2006.01) |

(52) U.S. Cl.
CPC ............. *F01D 5/186* (2013.01); *F01D 5/189* (2013.01); *F01D 9/041* (2013.01); *F01D 25/12* (2013.01);
(Continued)

(58) Field of Classification Search
CPC .......... F01D 5/186; F01D 5/189; F01D 9/041; F01D 25/12; F05D 2220/32;
(Continued)

(56) References Cited

U.S. PATENT DOCUMENTS 3,369,792 A * 2/1968 Kraimer ................. F01D 5/188
                                                                  415/115
3,799,696 A * 3/1974 Redman .................. F01D 5/189
                                                                  415/115
(Continued)

FOREIGN PATENT DOCUMENTS

| EP | 1106781 | 6/2001 |
| EP | 1126135 | 8/2001 |

OTHER PUBLICATIONS

International Search Report and Written Opinion for PCT Application No. PCT/US2014/035419, dated Feb. 11, 2015.
(Continued)

*Primary Examiner* — Jason D Shanske
*Assistant Examiner* — Brian Christopher Delrue
(74) *Attorney, Agent, or Firm* — Carlson, Gaskey & Olds, P.C.

(57) ABSTRACT

An airfoil for a gas turbine engine includes an outer airfoil wall that provides an exterior surface and multiple radially extending cooling passages. The exterior surface provides pressure and suctions sides joined by leading and trailing edges. The cooling passages include a supply passage arranged upstream from and in fluid communication with a trailing edge passage. A cooling hole extends through the
(Continued)

outer airfoil wall from the supply passage to the exterior surface on the suction side.

15 Claims, 3 Drawing Sheets

(52) U.S. Cl.
CPC ...... *F05D 2220/32* (2013.01); *F05D 2240/12* (2013.01); *F05D 2240/122* (2013.01); *F05D 2240/124* (2013.01); *F05D 2240/30* (2013.01); *F05D 2260/201* (2013.01); *F05D 2260/202* (2013.01); *Y02T 50/672* (2013.01); *Y02T 50/676* (2013.01)

(58) Field of Classification Search
CPC ........... F05D 2240/12; F05D 2240/122; F05D 2240/124; F05D 2240/30; F05D 2260/201; F05D 2260/202; Y02T 50/672; Y02T 50/676
USPC ........................................................ 415/115
See application file for complete search history.

(56) References Cited

U.S. PATENT DOCUMENTS

| | | | | |
|---|---|---|---|---|
| 3,930,748 A * | 1/1976 | Redman | ............... | F01D 5/189 415/115 |
| 4,153,386 A * | 5/1979 | Leogrande | ............ | F01D 5/186 415/115 |
| 4,543,781 A * | 10/1985 | Rice | ..................... | F01K 23/10 60/730 |
| 4,616,976 A * | 10/1986 | Lings | ..................... | F01D 5/186 415/114 |
| 5,120,192 A * | 6/1992 | Ohtomo | ................. | F01D 5/189 415/115 |
| 5,193,975 A * | 3/1993 | Bird | ...................... | F01D 5/186 415/115 |
| 5,624,231 A * | 4/1997 | Ohtomo | ................. | F01D 5/186 415/115 |
| 6,283,708 B1 | 9/2001 | Zelesky | | |
| 6,325,593 B1 * | 12/2001 | Darkins, Jr. | ........... | F01D 5/186 415/115 |
| 6,422,819 B1 * | 7/2002 | Tsai | ...................... | F01D 5/186 416/235 |
| 6,428,273 B1 * | 8/2002 | Keith | .................... | F01D 5/189 416/97 R |
| 7,156,619 B2 * | 1/2007 | Papple | ................... | F01D 5/187 415/115 |
| 9,322,279 B2 * | 4/2016 | Spangler | ............... | F01D 5/186 |
| 2002/0037217 A1 | 3/2002 | Itzel et al. | | |
| 2010/0183429 A1 | 7/2010 | Liang | | |

OTHER PUBLICATIONS

International Preliminary Report on Patentability for PCT Application No. PCT/US2014/035419 dated Dec. 17, 2015.
The Extended European Search Report for European Application No. 14830146.8, dated May 9, 2016.

\* cited by examiner

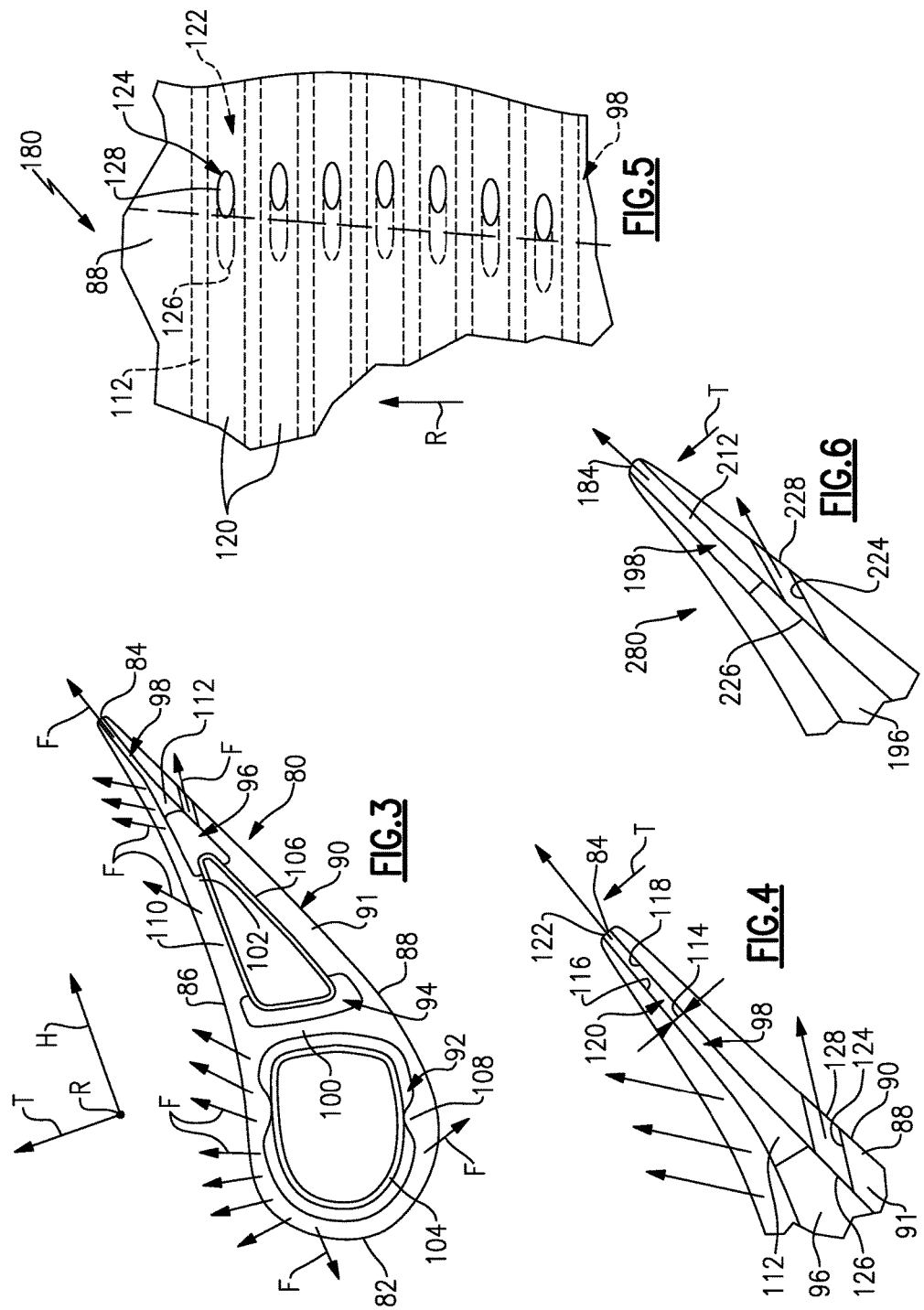

US 10,253,634 B2

GAS TURBINE ENGINE AIRFOIL TRAILING EDGE SUCTION SIDE COOLING

BACKGROUND

This disclosure relates to a gas turbine engine, and more particularly to an airfoil with a suction side cooling hole that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

In turbine vane design, there is an emphasis on stress-resistant airfoil and platform designs, with reduced losses, increased lift and turning efficiency, and improved turbine performance and service life. The airfoils include cooling features, such as film cooling holes that are supplied cooling fluid through cooling passages. The cooling passages are intended to protect the airfoil from the hot combustion gases.

SUMMARY

In one exemplary embodiment, an airfoil for a gas turbine engine includes an outer airfoil wall that provides an exterior surface and multiple radially extending cooling passages. The exterior surface provides pressure and suctions sides joined by leading and trailing edges. The cooling passages include a supply passage arranged upstream from and in fluid communication with a trailing edge passage. A cooling hole extends through the outer airfoil wall from the supply passage to the exterior surface on the suction side.

In a further embodiment of any of the above, the trailing edge passage is provided by substantially parallel surfaces and includes a trailing edge cooling opening at the trailing edge.

In a further embodiment of any of the above, the surfaces are interconnected to one another in a thickness direction by structure.

In a further embodiment of any of the above, the cooling passage includes first, second and third cooling passages progressively aftward of one another. The supply passage is provided by the third cooling passage.

In a further embodiment of any of the above, the airfoil is a fixed vane. The second passage includes a baffle. The cooling hole is arranged downstream from the baffle.

In a further embodiment of any of the above, the cooling hole includes an exit in the exterior surface. The exit forward of the trailing edge passage is in a chordwise direction.

In a further embodiment of any of the above, the cooling hole includes an exit in the exterior surface. The exit overlaps the trailing edge passage in a chordwise direction.

In a further embodiment of any of the above, the cooling hole is in the last quarter of the airfoil in a chordwise direction.

In another exemplary embodiment, a turbine section for a gas turbine engine includes an array of fixed vanes. An array of rotatable blades is downstream from the fixed vane array. At least one of the fixed vanes and rotatable blades include an airfoil having an outer airfoil wall that provides an exterior surface and multiple radially extending cooling passages. The exterior surface provides pressure and suctions sides joined by leading and trailing edges. The cooling passages include a supply passage arranged upstream from and in fluid communication with a trailing edge passage. A cooling hole extends through the outer airfoil wall from the supply passage to the exterior surface on the suction side.

In a further embodiment of any of the above, the trailing edge passage is provided by substantially parallel surfaces and includes a trailing edge cooling opening at the trailing edge.

In a further embodiment of any of the above, the surfaces are interconnected to one another in a thickness direction by structure.

In a further embodiment of any of the above, the cooling passage includes first, second and third cooling passages progressively aftward of one another. The supply passage is provided by the third cooling passage.

In a further embodiment of any of the above, the second passage includes a baffle. The cooling hole is arranged downstream from the baffle.

In a further embodiment of any of the above, the cooling hole includes an exit in the exterior surface. The exit is forward of the trailing edge passage in a chordwise direction.

In a further embodiment of any of the above, the cooling hole includes an exit in the exterior surface. The exit overlaps the trailing edge passage in a chordwise direction.

In a further embodiment of any of the above, the cooling hole is in the last quarter of the airfoil in a chordwise direction.

BRIEF DESCRIPTION OF THE DRAWINGS

The disclosure can be further understood by reference to the following detailed description when considered in connection with the accompanying drawings wherein:

FIG. 3 is a cross-sectional view of an airfoil taken along line 3-3 of FIG. 2.

FIG. 4 is an enlarged view of a trailing edge portion of the airfoil shown in FIG. 3.

FIG. 5 is a side view of the trailing edge portion of the airfoil shown in FIGS. 3 and 4.

FIG. 6 is an enlarged view of another trailing edge portion of an airfoil.

DETAILED DESCRIPTION

Figure 1:
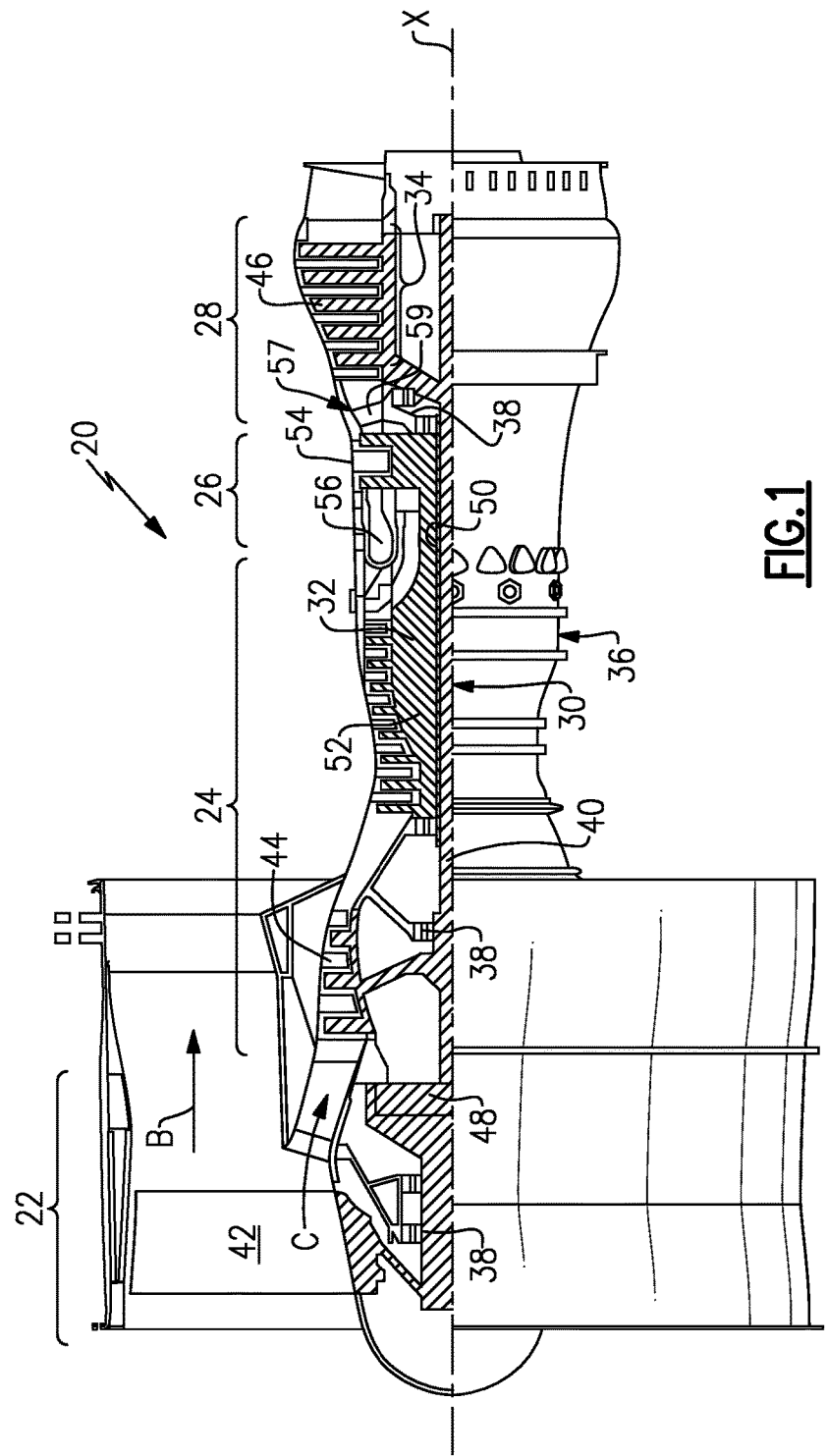
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }° R)/18.7]^{0.5}$. The "Low corrected fan tip speed", as disclosed herein according to one non-limiting embodiment, is less than about 1150 ft/second.

Figure 2:
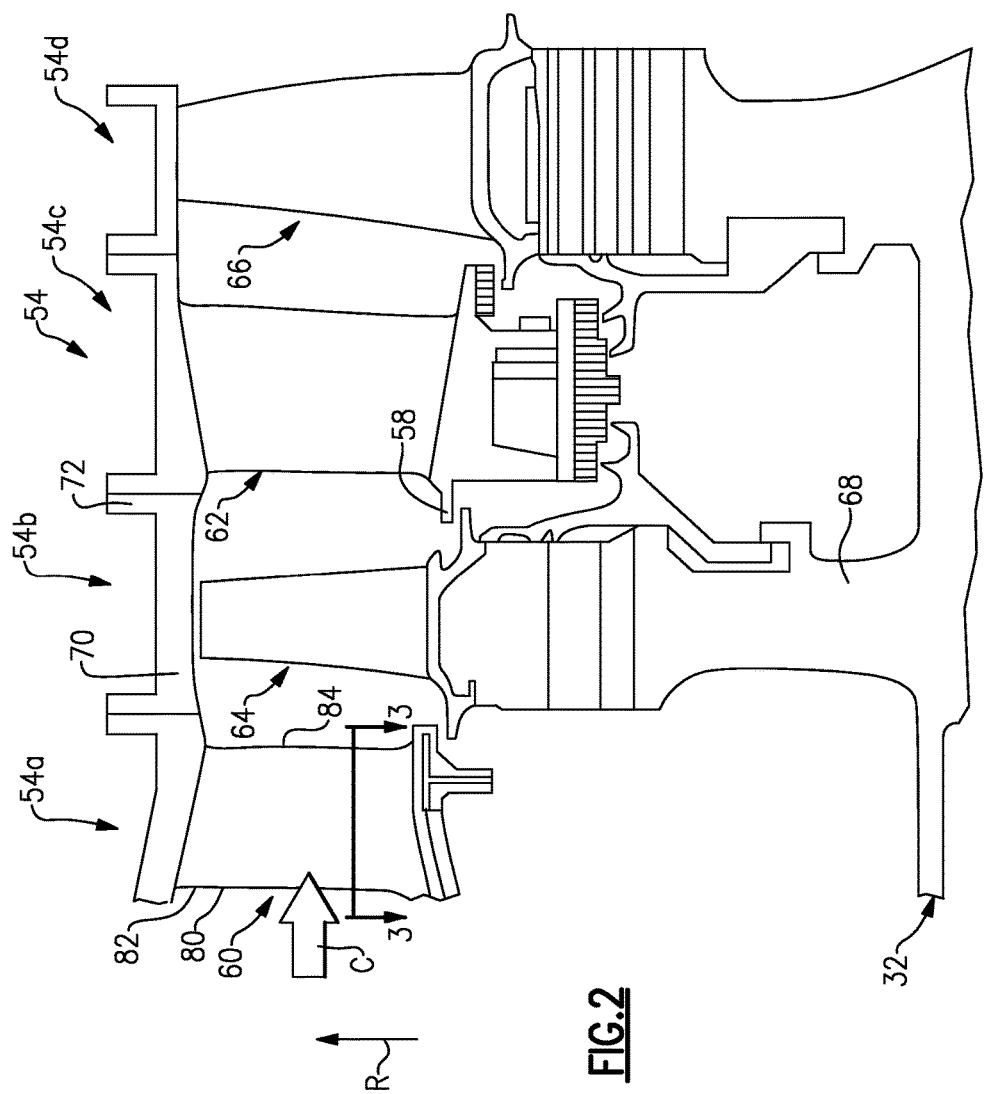
FIG. 2 is a cross-sectional view through a high pressure turbine section.

Referring to FIG. 2, a cross-sectional view through a high pressure turbine section 54 is illustrated. In the example high pressure turbine section 54, first and second arrays 54a, 54c of circumferentially spaced fixed vanes 60, 62 are axially spaced apart from one another. A first stage array 54b of circumferentially spaced turbine blades 64, mounted to a rotor disk 68, is arranged axially between the first and second fixed vane arrays 54a, 54c. A second stage array 54d of circumferentially spaced turbine blades 66 is arranged aft of the second array 54c of fixed vanes 62.

The turbine blades each include a tip adjacent to a blade outer air seal 70 of a case structure 72. The first and second stage arrays 54a, 54c of turbine vanes and first and second stage arrays 54b, 54d of turbine blades are arranged within a core flow path C and are operatively connected to a spool 32.

Each vane 60 includes an inner platform and an outer platform respectively defining inner and outer flow paths. The platforms are interconnected by an airfoil 80 extending in a radial direction R. It should be understood that the turbine vanes may be discrete from one another or arranged in integrated clusters. The airfoil 80 provides leading and trailing edges 82, 84, as shown in FIG. 3.

In the example, the airfoil 80 is a stator vane. However, it should be understood that the airfoil may be used in a blade. Moreover, the airfoil 80 may be used in the compressor section 24 as well as the turbine section 28.

With continuing reference to FIG. 3, the airfoil 80 is provided between pressure (generally concave) and suction (generally convex) sides 86, 88 in an airfoil thickness direction T, which is generally perpendicular to a chord-wise direction H provided between the leading and trailing edges 82, 84. Multiple turbine vanes 60 are arranged circumferentially in a circumferential direction.

In one example, the turbine vanes 60 are constructed from a high strength, heat resistant material such as a nickel-based or cobalt-based superalloy, or of a high temperature, stress resistant ceramic or composite material. In cooled configurations, internal fluid passages and external cooling apertures provide for a combination of impingement and film cooling. Other cooling approaches may be used such as trip strips, pedestals or other convective cooling techniques. In addition, one or more thermal barrier coatings, abrasion-resistant coatings or other protective coatings may be applied to the turbine vane 60.

Film cooling holes may be provided in the airfoil 80 to communicate cooling fluid from the cooling passages to an exterior surface 90 of the airfoil 80. Film cooling flow F flows from a film cooling holes (some are not shown for clarity) to create a boundary layer of cooling fluid that protects the exterior surface 90 from hot gases within the gas flow path.

In the example airfoil 80, first, second, third and trailing edge cooling passages 92, 94, 96, 98 are provided within the airfoil 80. The passages 92, 94, 96, 98 extend radially and are fluidly connected to one another in the chord-wise direction H. The third passage 96 acts as a supply passage for the trailing edge cooling passage 98. The exterior surface 90 is provided by an outer airfoil wall 91. In the example, first and second walls 100, 102 extends internally between the outer airfoil wall 91 to provide the first, second and third cooling passages 92, 94, 96.

The airfoil 80 includes first and second baffles 104, 106, and include multiple cooling holes (not shown) to provide impingement cooling on the internal surfaces of the cooling passages. The first baffle 104 is spaced from the inner surface of the first cooling passage 92 by a first rib 108, which may be provided by multiple bumps extending inwardly from the outer airfoil wall 91. The second baffle 106 is spaced apart from the inner surface of the second cooling passage 94 by the second wall 102 and a second rib 110. In the example, the third cooling passage 96 includes third ribs 112. The ribs 108, 110, 112 are spaced apart from one another in the radial direction R, permitting fluid flow in the chord-wise direction. The trailing edge cooling passage 98 is arranged downstream from both the first and second baffles 104, 106.

Referring to FIGS. 3 and 4, the trailing edge cooling passage 98 is arranged downstream from the third cooling passage 96. The trailing edge cooling passage 98 includes first and second surfaces 116, 118 that are substantially parallel to one another and spaced apart from one another a width 114, which in one example is about 0.015 inch (0.381 mm). In the example, the ribs 112 join the first and second surfaces 116, 118 and provide a trailing edge exit 122 at the trailing edge 84. However, it should be understood that other structure, such as pedestals, may be used additionally or alternatively.

The third cooling passage 96 is downstream from the first and second baffles 104, 106. A trailing edge suctions side cooling hole 124 is provided in the outer airfoil wall and communicates the film cooling flow from an inlet 126 in the third cooling passage 96 to an exit 128 provided in the exterior surface 90. The inlet 126 is arranged fluidly downstream from the first and second baffles 104, 106 and upstream from the trailing edge cooling passage 98. In this location, the inlet 126 receives unobstructed flow of fluid, providing sufficient flow to the exit 128. The exit 128 is arranged forward of the trailing edge passage 98 in the chordwise direction H and in the aft quarter of the airfoil.

Referring to FIG. 5, the exit 128 is arranged downstream from the trailing edge cooling passage 98. The inlet 126 is arranged in overlapping relationship with the third ribs 112 in the chordwise direction H. In one example, the inlet 126 is between the third ribs 112 in the radial direction R and upstream from the trailing edge cooling passage.

Another example cooling configuration is shown in FIG. 6. The trailing edge suction side cooling hole 224 includes an inlet 226 arranged in fluid communication with a cooling passage 196 arranged upstream from the trailing edge cooling passage 198 and the ribs 212. The exit 228 of the trailing edge suction side cooling hole 224 overlaps the trailing edge cooling passage 198 downstream from the cooling passage 196 in the chordwise direction. In the example, the rib 212 generally does not extend outside of the trailing edge cooling passage 198. The exit 228 may be offset from or aligned with the ribs 212 in the radial direction.

Although an example embodiment has been disclosed, a worker of ordinary skill in this art would recognize that certain modifications would come within the scope of the claims. For example, it should be understood that the numbers of and various geometries relating to the baffles and ribs may be different that disclosed and still fall within the scope of the claims. For that reason, the following claims should be studied to determine their true scope and content.

What is claimed is:

1. An airfoil for a gas turbine engine comprising: an outer airfoil wall providing an exterior surface and multiple radially extending cooling passages, the exterior surface provides pressure and suction sides joined by leading and trailing edges, the cooling passages include a supply passage for a trailing edge passage, the supply passage being arranged upstream from and in fluid communication with the trailing edge passage, a cooling hole extending through the outer airfoil wall from the supply passage to the exterior surface on the suction side;

wherein the cooling passages include first, second and third cooling passages are arranged progressively aftward of one another wherein the second cooling passage is arranged aftward of the first cooling passage, and the third cooling passage is arranged aftward of the second and third cooling passages, the supply passage is provided by the third cooling passage, and wherein the second passage includes a baffle, the cooling hole is arranged downstream from the baffle with respect to a chordwise direction provided between the leading and trailing edges, an end of the baffle arranged in the supply passage;

the baffle is spaced apart from an inner surface of the second cooling passage by a rib; and wherein the trailing edge passage includes first and second surfaces that are interconnected to one another in a thickness direction by a structure, the thickness direction perpendicular to the chordwise direction, wherein the structure is provided by radially spaced apart trailing edge ribs that each extend longitudinally in the chordwise direction, the radially spaced apart trailing edge ribs are configured to permit fluid flow in the chord-wise direction.

2. The airfoil according to claim 1, wherein the trailing edge passage is provided by interiorly facing surfaces and includes a trailing edge cooling opening at the trailing edge.

3. The airfoil according to claim 1, wherein the airfoil is a fixed vane, and the second passage includes a baffle, the cooling hole is arranged downstream from the baffle.

4. The airfoil according to claim 1, wherein the cooling hole includes an exit in the exterior surface, the exit forward of the trailing edge passage in the chordwise direction.

5. The airfoil according to claim 1, wherein the cooling hole includes an exit in the exterior surface, the exit overlapping the trailing edge passage in the chordwise direction.

6. The airfoil according to claim 1, wherein the cooling hole is in the last quarter of the airfoil in a chordwise direction.

7. A turbine section for a gas turbine engine comprising:
an array of fixed vanes;
an array of rotatable blades downstream from the fixed vane array; and
wherein at least one of the fixed vanes and rotatable blades include an airfoil having an outer airfoil wall providing an exterior surface and multiple radially extending cooling passages, the exterior surface provides pressure and suction sides joined by leading and trailing edges, the cooling passages include a supply passage for a trailing edge passage, the supply passage being arranged upstream from and in fluid communication with the trailing edge passage, a cooling hole extending through the outer airfoil wall from the supply passage to the exterior surface on the suction side;
wherein the cooling passages include first, second and third cooling passages are arranged progressively aftward of one another wherein the second cooling passage is arranged aftward of the first cooling passage, and the third cooling passage is arranged aftward of the second and third cooling passages, the supply passage is provided by the third cooling passage, and wherein the second passage includes a baffle, the cooling hole is arranged downstream from the baffle with respect to a chordwise direction provided between the leading and trailing edges, an end of the baffle arranged in the supply passage;
the baffle is spaced apart from an inner surface of the second cooling passage by a rib; and
wherein the trailing edge passage includes first and second surfaces that are interconnected to one another in a thickness direction by a structure, the thickness direction perpendicular to the chordwise direction, wherein the structure is provided by radially spaced apart trailing edge ribs that each extend longitudinally in the chordwise direction, the radially spaced apart trailing edge ribs are configured to permit fluid flow in the chord-wise direction.

8. The turbine section according to claim 7, wherein the trailing edge passage is provided by interiorly facing surfaces and includes a trailing edge cooling opening at the trailing edge.

9. The turbine section according to claim 7, wherein the second passage includes a baffle, the cooling hole is arranged downstream from the baffle.

10. The turbine section according to claim 7, wherein the cooling hole includes an exit in the exterior surface, the exit forward of the trailing edge passage in the chordwise direction.

11. The turbine section according to claim 7, wherein the cooling hole includes an exit in the exterior surface, the exit overlapping the trailing edge passage in the chordwise direction.

12. The turbine section according to claim 7, wherein the cooling hole is in the last quarter of the airfoil in a chordwise direction.

13. An airfoil for a gas turbine engine comprising:
an outer airfoil wall providing an exterior surface and multiple radially extending cooling passages, the exterior surface provides pressure and suction sides joined by leading and trailing edges, the cooling passages include a supply passage for a trailing edge passage, the supply passage being arranged upstream from an in fluid communication with the trailing edge passage, a cooling hole extending through the outer airfoil wall from the supply passage to the exterior surface on the suction side;
wherein the cooling passages include first, second and third cooling passages arranged progressively aftward of one another such that the second cooling passage is arranged aftward of the first cooling passage, and the third cooling passage is arranged aftward of the second and third cooling passages, the supply passage is provided by the third cooling passage;
wherein the first cooling passage includes a first baffle spaced apart from an inner surface of the first cooling passage by a first rib, and the second cooling passage includes a second baffle spaced apart from an inner surface of the second cooling passage by a second rib; and
wherein the trailing edge passage includes first and second surfaces that are interconnected to one another in a thickness direction by a structure, the thickness direction perpendicular to the chordwise direction, wherein the structure is provided by radially spaced apart trailing edge ribs that each extend longitudinally in the chordwise direction, the radially spaced apart ribs are configured to permit fluid flow in the chordwise direction;
wherein an end of the second baffle extends into the supply passage.

14. The airfoil according to claim 13, wherein the cooling hole is arranged downstream from the second baffle with respect to a chordwise direction provided between the leading and trailing edges.

15. The airfoil according to claim 13, wherein the third passage include third ribs.

* * * * *